June 8, 1926.
L. H. KILLMER
1,588,378
DIRECTION INDICATOR FOR TRUCKS
Filed Dec. 15, 1924
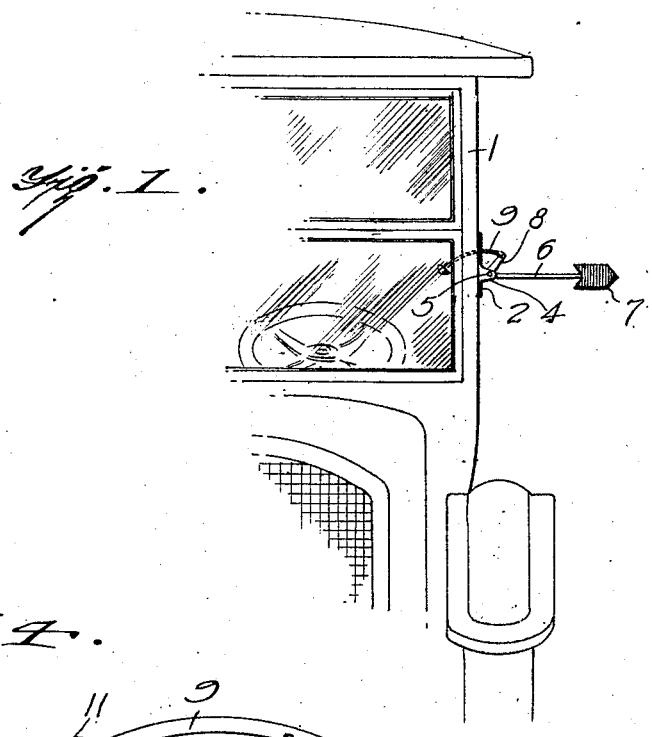
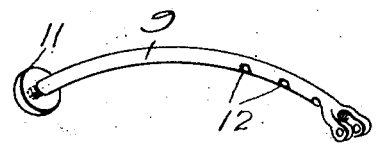
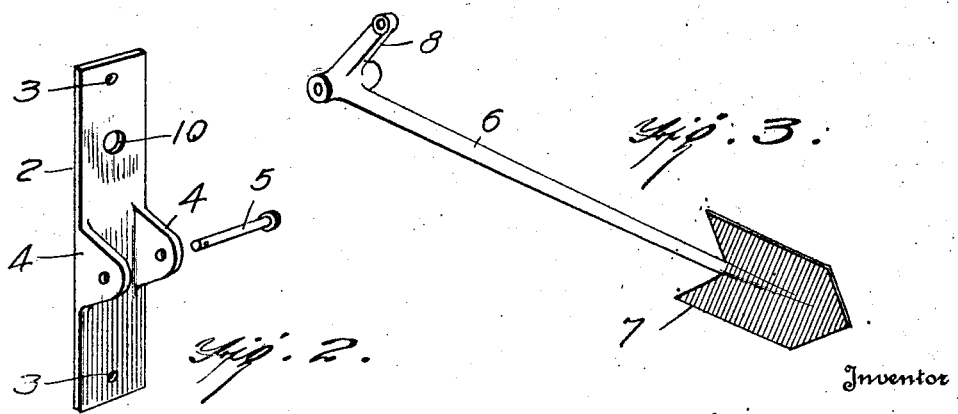
Inventor
LOUIS H. KILLMER,
By
Attorney Patented June 8, 1926.

1,588,378

UNITED STATES PATENT OFFICE.

LOUIS H. KILLMER, OF OSSEO, MINNESOTA.

DIRECTION INDICATOR FOR TRUCKS.

Application filed December 15, 1924. Serial No. 756,086.

The object of the invention is to provide a device of simplified construction that may be readily applied to a vehicle, particularly of the truck type wherein the operator sits in a cab, making it difficult to give the usual manual signals.

With this object in view, the invention consists in the construction and combination of parts of which a preferred embodiment is illustrated in the accompanying drawings, wherein:

Figure 1 is an elevational view of the invention, there being illustrated the front corner post of a cab and adjacent section of the windshield to show the position of the device with relation thereto when applied.

Figures 2, 3 and 4 are respectively detail views in perspective illustrating the base plate or attaching member, the signal arm, and the operating element.

In the use of the invention with vehicles of the enclosed type, such as sedans or the like or trucks, wherein the operator sits in a cab, the preferable point of mounting of the direction signal is on the left corner post 1 and in the present invention, a bracket 2 is provided for attachment to this corner post on the outer side face of the latter, the bracket being provided with holes 3 for the reception of screws for retaining it in position. The signal is designed for pivotal mounting on the bracket and to this end, the latter is provided with spaced ears 4 which are spanned by a pivot pin 5, the latter pivotally supporting the signal arm 6 carrying a pointer 7 at its extremity.

The signal arm 6 is provided with an angular arm 8 and the pivot is mounted at the point of juncture of the main and angular arms. The angular arm 8 at its extremity is pivotally connected with an arcuate operating member 9 passing loosely through an eye 10 in the base plate of the bracket 2, the corner post being bored in registration with said eye to provide a guide for the operating member. The free extremity of the latter, therefore, is accessible from the interior of the cab with the signalling member disposed exteriorly thereto, the operating element being provided with a terminal head 11 for engagement by the hand of the operator and being also provided on its inner edge with spaced notches 12 which may engage the base plate of the bracket on the lower edge of the eye to dispose the signal in as many angular positions with reference to the corner post as there are notches in said operating element. The notches are preferably disposed so that when the middle one is engaged with the base plate, the signal arm stands in a position at right angles to the corner post. Thus, the remaining two notches, if engaged, will dispose the signal arm in angular positions respectively above and below the horizontal position, the horizontal position being selected for that indicating a left turn and the upper and lower angular positions indicating respectively right hand turn and stop.

The invention having been described, what is claimed as new and useful is:

A direction indicator comprising a bracket having a base plate in which is formed a guide eye, said bracket being provided with spaced ears, a pivot pin spanning said ears, a signalling arm having a pivotal mounting on said pin and disposed between said ears, said signalling arm being provided with an angular arm, an arcuate operating member having a running engagement with the guide eye and a terminal pivotal connection with said angular arm, said arcuate member being provided on its inner edge with spaced notches for selective engagement with the edge of the eye.

In testimony whereof he affixes his signature.

LOUIS H. KILLMER.